United States Patent [19]
Delius

[11] Patent Number: 4,575,604
[45] Date of Patent: * Mar. 11, 1986

[54] CONSTANT POTENTIAL/CONSTANT CURRENT AUTOMATIC CONTROL SYSTEM FOR AIR-CARBON ARC METAL REMOVAL

[75] Inventor: Henry B. Delius, Lancaster, Ohio

[73] Assignee: Arcair Company, Lancaster, Ohio

[ * ] Notice: The portion of the term of this patent subsequent to Jan. 8, 2002 has been disclaimed.

[21] Appl. No.: 662,208

[22] Filed: Oct. 18, 1984

Related U.S. Application Data

[63] Continuation of Ser. No. 485,804, Apr. 18, 1983, Pat. No. 4,492,841.

[51] Int. Cl.$^4$ .............................................. B23K 9/10
[52] U.S. Cl. ............................. 219/69 R; 219/130.32; 219/130.33
[58] Field of Search .................... 219/68, 69 R, 69 G, 219/130.33, 130.32, 130.31, 130.21, 124.22, 124.5, 137.71

[56] References Cited

U.S. PATENT DOCUMENTS

| | | | |
|---|---|---|---|
| 3,659,071 | 4/1972 | Henderson | 219/69 G |
| 4,247,751 | 1/1981 | Ashton et al. | 219/130.31 |
| 4,288,682 | 9/1981 | Toth | 219/137.71 |
| 4,320,282 | 3/1982 | MacDonald et al. | 219/137 PS |
| 4,492,841 | 1/1985 | Delius | 219/69 R |

FOREIGN PATENT DOCUMENTS 57-81964  5/1982  Japan .............................. 219/130.31

*Primary Examiner*—Clifford C. Shaw
*Attorney, Agent, or Firm*—James C. Simmons

[57] ABSTRACT

A control system for air-carbon arc metal removal in which the arc is automatically controlled and in which the arc power is produced by either a constant potential or constant current power source. For a constant potential source, the arc current is maintained at a predetermined value by sensing the magnitude of the arc current and for a constant current source the arc voltage is maintained at a predetermined value by sensing the magnitude of the arc voltage. The presence of an arc current above a threshold is sensed for a predetermined interval to provide relative motion between the workpiece carriage and the electrode. If the electrode arc current drops below a predetermined threshold, a low current sensing circuit is actuated. If the arc current remains below the threshold for a predetermined time interval, the carriage travel is terminated. If the arc current remains below the threshold for longer than a predetermined amount of time, the electrode power is turned off. In addition, if the arc voltage drops or remains below a threshold for a predetermined time period, the electrode power is also turned off.

5 Claims, 3 Drawing Figures

CONSTANT POTENTIAL/CONSTANT CURRENT AUTOMATIC CONTROL SYSTEM FOR AIR-CARBON ARC METAL REMOVAL

This application is a continuation of application Ser. No. 485,804, filed Apr. 18, 1983, now U.S. Pat. No. 4,492,841.

BACKGROUND OF THE INVENTION

1. Field of the Invention

This invention relates to the automatic control of the current or voltage of an arc drawn between an electrode and a workpiece for purposes of air-carbon arc cutting and gouging.

2. Background Art

In air-carbon arc cutting and gouging of metal, it is highly desirable to be able to accurately control the spacing of an electrode with respect to a workpiece so as to effect an accurate cut. As described in U.S. Pat. No. 3,659,071, it has previously been possible to control the spacing of an electrode with respect to the workpiece to a close tolerance by sensing any variation in arc voltage from a steeply drooping voltage source. The electrode then would be automatically moved in a direction to cancel the variation.

Prior air-carbon arc metal removal systems have been limited in that they have not been compatible with both constant potential and constant current sources nor have they provided certain control and automation features. U.S. Pat. No. 4,320,282 shows control of arc sustaining parameters to mitigate arc quenching impulse noise.

Accordingly, an object of the present invention is a system for automatically controlling an arc which is powered from either a constant potential source or a constant current source.

Another object of the invention is automatically providing relative motion between the electrode and the workpiece after arc current above a predetermined value has been present a predetermined amount of time.

Another object is automatically turning the arc source off if the arc voltage drops below or rises above a predetermined threshold for a predetermined amount of time.

Still another object of the invention is automatically turning the arc source off if the arc current drops below a predetermined threshold for a predetermined amount of time.

A still further object is automatically retracting the electrode from the workpiece for a predetermined amount of time long enough to insure physical separation of the electrode and the workpiece when the arc current has been extinguished.

SUMMARY OF THE INVENTION

In air-carbon arc metal removal a control system for automatically controlling the arc between a carbon electrode and a conductive workpiece when powered from either a constant potential or constant current power source. The electrode is controlled to alternately feed and retract from the conductive workpiece to maintain either a specific arc voltage or arc current level as set by an operator. For a constant potential source, the arc current is maintained at a predetermined value by sensing the magnitude of the arc current and thereby controlling the electrode. For a constant current source, the arc voltage is maintained at a predetermined value by sensing the magnitude of the arc voltage and thereby controlling the electrode. The control system senses the presence of an arc current above a threshold for a predetermined interval and provides relative motion between the workpiece carriage and the electrode thus allowing the electrode arc to cut to a controlled depth groove in the workpiece. In the event that the electrode arc current drops below the predetermined threshold, a low current sensing circuit is activated. If the electrode arc current remains below the threshold for a predetermined time interval as a result, typically, of reaching the edge of the workpiece, the workpiece carriage travel is terminated. If the arc current remains below the threshold for longer than a predetermined amount of time, the electrode power is turned off. This may also be accomplished if the arc voltage rises above a predetermined threshold. The control system also senses if the arc voltage drops and remains below a threshold for a predetermined time period. This latter capability permits automatic detection and shutdown in the presence of electrode-to-workpiece shortouts.

DETAILED DESCRIPTION OF THE INVENTION

Figure 1:
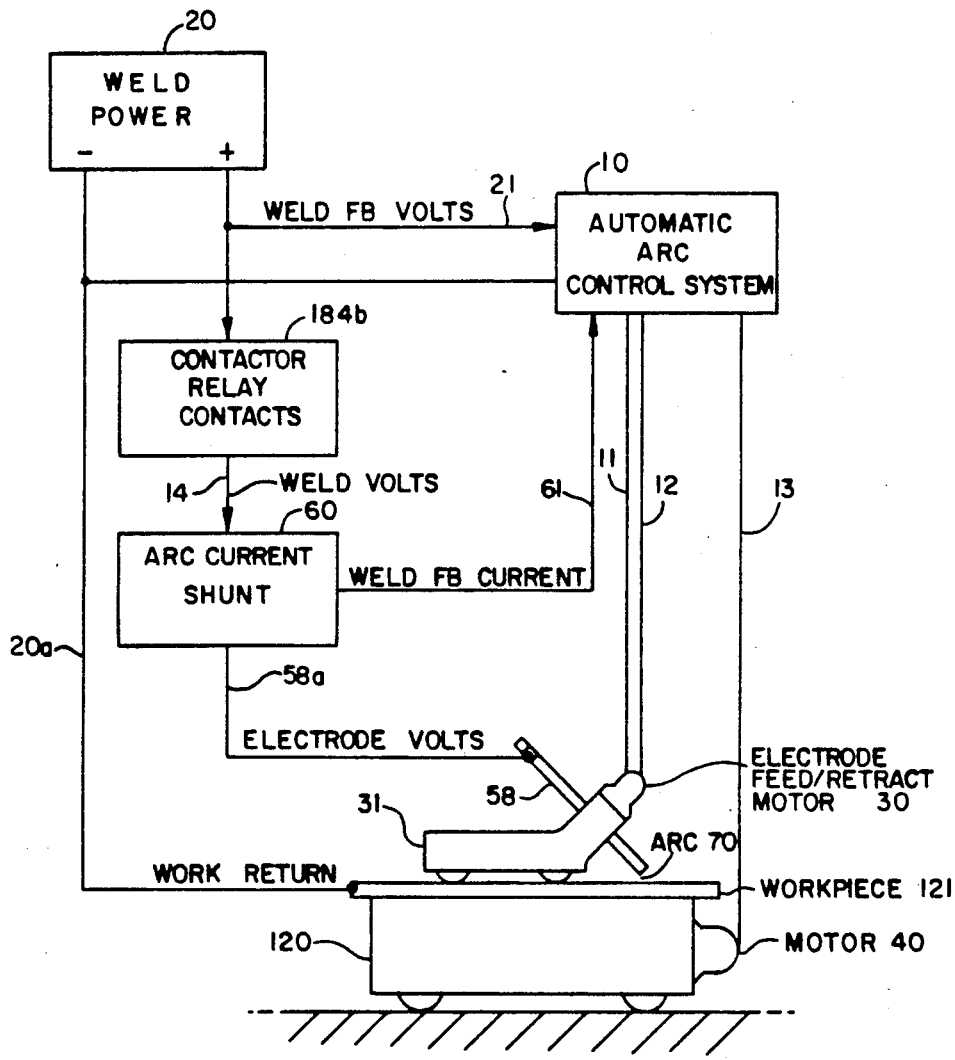
FIG. 1 is a block diagram showing the interconnection of the automatic arc control system invention with a welding power source and a carbon electrode.
Figure 2:
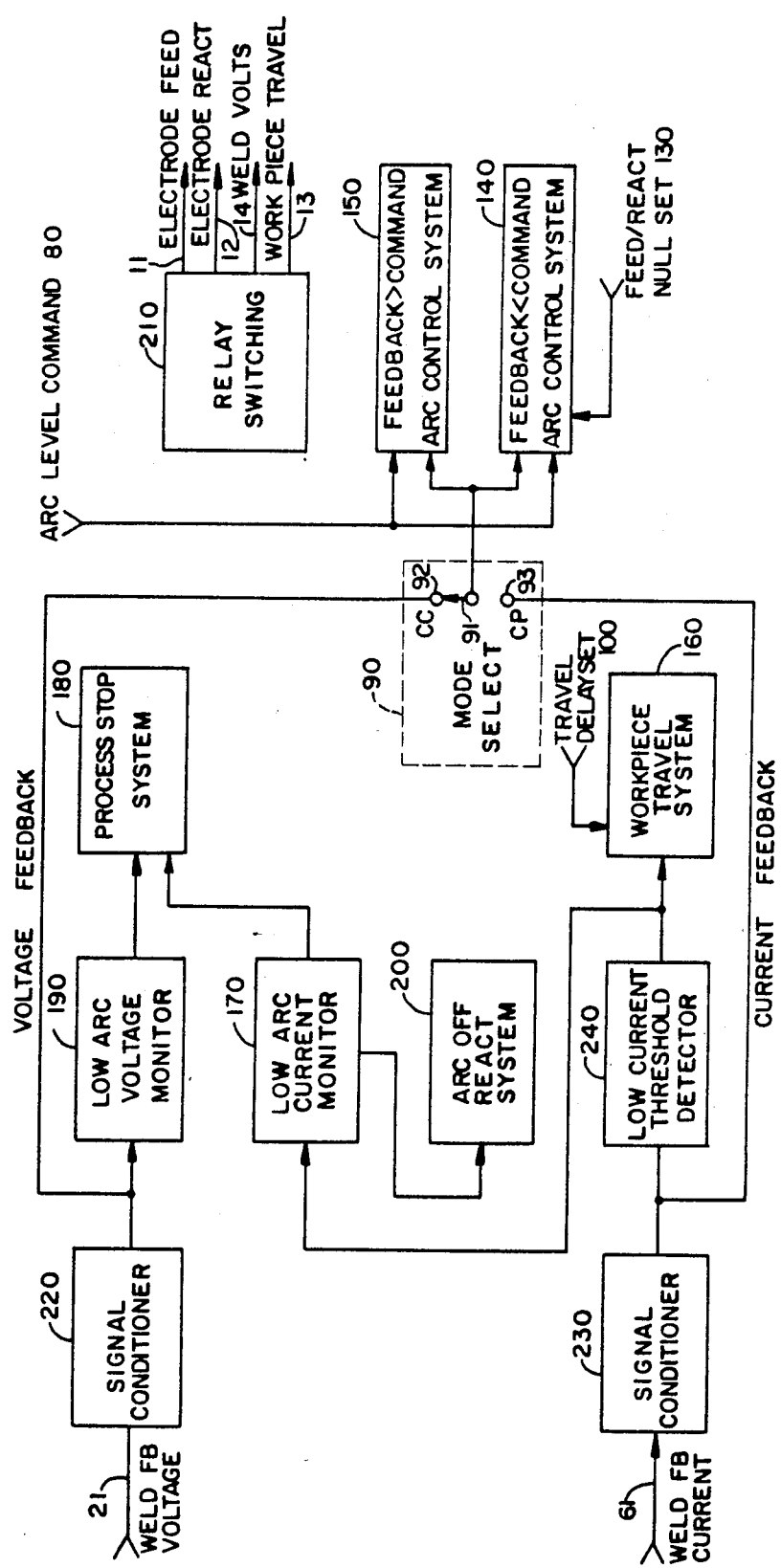
FIG. 2 is a functional block diagram of the preferred embodiment of the automatic arc control system.

Referring to the block diagrams of FIGS. 1 and 2, an automatic arc control system 10 is connected to an electrical welding power source 20, electrode feed retract motor 30, carbon electrode 58, and workpiece travel motor 40. One signal monitored by automatic control system 10 is the weld feedback "FB" volts on cable 21. This signal is used to monitor the electrode-to-workpiece voltage across arc 70. Similarly, the weld FB current derived from arc current shunt 60 is monitored by automatic control system 10 via cable 61. The weld FB current is proportional to the current passing through arc 70. Automatic outputs of control system 10 include the operation of contactor relay contacts 184b, feed/retract signals by way of conductors 11,12 to electrode feed/retract motor 30, and the travel enable signal by way of conductor 13 to the workpiece travel motor 40.

The operator begins operation of system 10 by adjusting the mode select switch 90 to either a constant current or constant potential setting depending upon the kind (constant potential "CP" or constant current "CC") of welding power source 20 being used. He then adjusts the arc level command 80 to a prescribed arc current or voltage level consistent with the mode switch 90 setting: e.g., if a constant potential power source 20 is used, a specific arc current level is set. If a constant current source 20 is used, an arc voltage level is set. The operator adjusts the travel delay 100 to a satisfactory value and initiates the arc cutting process by way of a conventional process start, stop control 110.

Assuming that the mode select switch 90 is in the constant potential source mode when the electrode arc 70 is first struck, the weld FB current will initially exceed the value set into arc level command 80. The weld FB current, appropriately filtered and converted to a voltage analog for computational purposes by signal conditioner 230, is fed to feedback command arc control system 150 and feedback command arc control system 140. These two arc control systems alternately energize the feed and retract modes of electrode feed retract motor 30 to cause carbon electrode 58 to alternately feed and retract from the conductive workpiece 60 thereby to maintain arc 70 at a specific feedback current level. This is in response to a prescribed arc level command 80 as set into the automatic arc control system 10 by the operator.

If the mode select switch 90 was in the constant current source mode 92 the magnitude of the weld FB voltage 21 is then sensed. The weld FB voltage is filtered by signal conditioner 220 and applied to feedback command arc control systems 140 and 150. These two arc control systems alternately energize feed retract motor 30 so that electrode 58 alternately feeds and retracts from workpiece 121 thereby to maintain arc 70 at a specific voltage level.

The output of signal conditioner 230 is also fed to low current threshold 240. If the output voltage of signal conditioner 230 represents a weld current greater than threshold, (threshold typically being 200 amperes) then workpiece travel system 160 initiates a travel timing interval. If the weld current remains above threshold during the travel timing interval, the workpiece carriage 120 moves rearward with respect to the stationary carbon electrode 58, thus cutting a groove of prescribed depth in workpiece 60.

The electrode feed retract process previously described is sufficiently accurate so as to allow an electrode 58 to workpiece 121 gap 70 as small, typically, as one hundredth of an inch. At such spacing, the electrode may occasionally weld to the workpiece causing a shortout. A sustained shortout can damage the workpiece 121 as well as the power source 20. The weld FB voltage, suitably filtered and adjusted in amplitude by signal conditioner 220 is fed to low arc voltage monitor 190. Low arc voltage monitor 190 contains an arc voltage threshold detector (typically set at 27 volts when maximum weld voltage is 100 volts). If the weld FB voltage analog at the output of signal conditioner 220 falls below the arc voltage threshold for a predetermined length of time (as would happen during a shortout) low arc voltage monitor 190 provides a process stop signal to process stop system 180. The contactor relay in the process stop system 180 is thereby disabled, opening contactor relay contacts 184b and thus turning the arc cutting process off and avoiding damage due to a sustained shortout.

Absence of an arc current (because the contactor is off) is now sensed by arc off retract system 200. Relay contacts in relay switching system 210 are closed by the arc off retract system 200. The electrode 58 is thereby caused to retract from workpiece 121. Electrode retraction is timed by a retraction interval timer in the arc off retract system 200. The retraction interval is long enough to ensure that electrode 58 safely exits from workpiece 121. Thus arc control system 10 automatically retracts the electrode 58 during process shutdown.

An alternate process leading to shutdown results if the weld FB current analog at the output of signal conditioner 230 drops below the low current threshold, as measured by low current threshold detector 240, for a predetermined time as measured by low arc current monitor 170. This condition, caused by the electrode 58 reaching the end of the workpiece 121, causes the process stop system 180 to disable the contactor relay 184, shutting down the process. The foregoing may also be accomplished in a further embodiment of the invention by sensing a high arc voltage threshold instead of a low arc current threshold. Specifically, a switch assembly (not shown) would connect the input of monitor 170 to the arc FB voltage analog at the output of signal conditioner 220 instead of the output of detector 240. Accordingly, monitor 170 would then be effective to operate as a high voltage threshold detector. When the output of conditioner 220 rises above a high voltage threshold for a predetermined time as measured by monitor 170, process stop system 180 would disable relay 184 thereby shutting down the process.

Figure 3:
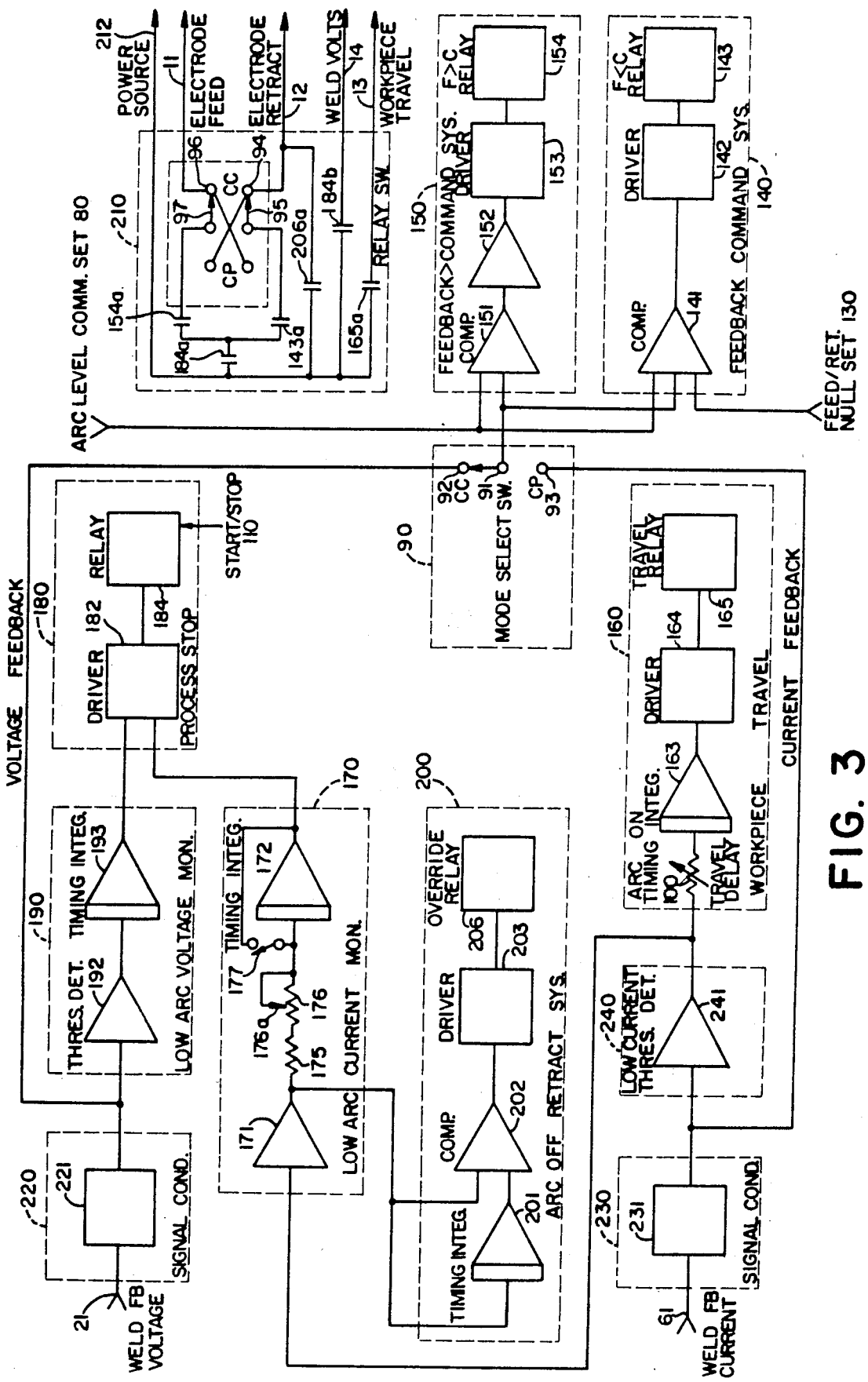
FIG. 3 is a schematic of the functional block diagram of FIG. 2.

A more detailed understanding of the preferred embodiment of the automatic arc control system 10 may be gotten by a review of the functional blocks and logic elements of FIG. 3.

Mode Switch 90

Switch 90 is ganged by way of arm 101 to a three pole double throw switch 99 in relay switching block 210. In combination these switches select either the constant current or constant potential modes of operation. When mode switch 90 is in the CC position, switch contacts 91,92 connect a voltage feedback signal at the output of signal conditioner 220 to the inputs of the feedback command system 150 and feedback command system 140. In this position, switch 99 contacts 94,95 connect relay contacts 143a to electrode retract line 12 and contacts 96, 97 connect relay contact 154a to electrode feed line 11.

When switch 90 is in the CP position, contacts 91,93 connect a current feedback signal at the output of signal conditioner 230 to the inputs of systems 140, 150. In this CP position, switch 99 contacts 95, 98a connect relay contacts 143a to electrode feed line 11 and switch contacts 97,98 connect relay contacts 154a to line 12.

Thus, the action of swtiches 90 and 99 is: (1) to select either a voltage or current feedback signal, and (2) to directly apply or reverse the connection of relay contacts 143a, 154a to electrode feed line 11 and electrode retract line 12.

Feedback Command System 140

The feedback command system 140 comprises command feedback comparator 141, relay driver 142, and solid state relay 143. The principal function of the feedback command system 140 is the activation of the electrode feed retract motor 30 via the solid state relay 143 when the weld voltage or current feedback signal (which feedback signal is present depends on mode switch 90 position) is less than the arc level command set 80 as entered by the operator.

In the constant current mode of operation, the arc level command set 80 is a voltage analog of the desired arc voltage. When the weld voltage feedback signal drops below the arc level command set 80, then feedback command system 140 causes electrode 58 to retract from the workpiece 121 raising the voltage feedback signal. In the constant potential mode of operation, the arc level command set 80 is a voltage analog of a desired arc current. When the weld current feedback signal drops below the arc level command set 80, then feedback command system 140 causes the electrode 58 to feed into the workpiece 121 raising the weld current feedback signal.

Solid state relay 143 will control either the electrode feed or retract mode of the electrode feed retract motor 30 depending upon the mode switch 90 position. If the mode switch 90 were in the constant current position for reading voltage feedback, then activating relay 143 enables the electrode retract mode of the electrode feed retract motor 30. If switch 90 were in its CP position for reading current feedback, then relay 143 enables the feed mode.

Feedback Command System 150

The feedback command system 150 comprises command feedback comparator 151, a unity gain signal inverter 152, relay driver 153, and solid state relay 154. The principal function of the feedback command system 150 is the actuation of the electrode feed retract motor 30 via the solid state relay 154 when the weld voltage or current feedback signal is greater than the level of the operator-set command 80. If switch 90 were in its CC position for reading voltage feedback, then relay 154 enables the feed mode. Alternatively, if switch 90 were in its CP position for reading voltage feedback, then relay 154 enables the retract mode. The feedback command logic 150 and the feedback command logic 140 previously discussed work in opposition: if one causes retraction of the electrode 58 under its comparator threshold conditions the other causes electrode 58 to feed under its comparator threshold conditions. In this manner, the null adjust 130 causes an offset in the threshold of comparator 141 which results in a delay or hysteresis effect minimizing oscillation between the retract and feed modes.

Signal Conditioner 230

The signal conditioner 230 includes an operational amplifier configured as a conventional Butterworth filter. Additionally the gain of the operational amplifier is set to convert the arc current shunt 60 full scale output of 50 millivolts to 10 volts. The bandwidth limiting of the Butterworth filter is necessary to remove high frequency components from the arc current derived signal.

Low Current Threshold Detector 240

The low current threshold detector 241 is adjusted to change state (typically from +15v to −15v) when the weld FB current signal analog at the output of the signal conditioner 230 is greater than a predetermined threshold (typically 2 volts when the full scale is 10 volts).

Workpiece Travel System 160

The workpiece travel system 160 comprises an operational amplifier configured as a positive-going integrator 163 and having an input potentiometer 100, relay driver 164 and travel relay 165. System 160 enables the workpiece carriage travel motor 40 via the travel relay 165 after the weld current exceeds the low current threshold 240 setting for a prescribed travel timing interval.

The travel timing interval measurement is accomplished by setting integrator 163 output initially at zero volts and linearly increasing the output with respect to time until relay, driver 164 enables travel relay 165. The workpiece travel system 60 disables the workpiece travel motor 40 if the weld current drops below the low current threshold longer than a prescribed interval. As shown in FIG. 1, workpiece 60 travels beneath a stationary electrode 58. In a further embodiment the workpiece may be stationary while the electrode carriage may travel, with control by the workpiece travel system 160.

Low Arc Current Monitor

The low arc current monitor 170 comprises a signal inverting unity gain operational amplifier 171 and an operational amplifier configured as a positive-going integrator 172. Monitor 170 disables the contactor relay 182 if the weld current drops below the low current threshold detector 240 setting for a prescribed "low arc current" length of time (typically 0.6 seconds). The measurement of the low arc current time interval is achieved by causing the output of integrator 172 to linearly drop from a maximum positive signal towards zero volts. Relay driver 182 (in the process stop system 180) disables relay 182 when integrator 172 output approaches zero volts.

As shown in FIG. 3, the input of integrator 172 is connected through resistor 175 and potentiometer 176. In addition, integrator 172 may be shunted so that it does not provide low current shutoff by means of a switch 177. These components are provided since conventional power supplies 20 have differing characteristics upon start up. Some power supplies may have a violent flow of current which has the effect of blowing the tip off the electrode causing shutdown. Other power supplies have more gentle start-up. Potentiometer wiper 176a may be adjusted to match many of these characteristics. For example, moving wiper to the left may match so-called normal characteristics of power supplies with less violent start-up. As wiper 176a is moved to the right, it would match special characteristics of more violent start-up by increasing the input resistance to timing integrator 172. When the operator does not want low current shutoff to occur at all, he may control this manually by closing switch 177 to clamp off the integrator.

Signal Conditioner 220

The signal conditioner 220 is similar to signal conditioner 230 previously described. A Butterworth filter is used to eliminate high frequency components contained in the weld voltage which is actually the voltage across arc 70. The gain of signal conditioner 220 is set to provide a full scale output of 10 volts when the weld voltage (on cable 21) is at about 100 volts.

Low Arc Voltage Monitor 190

The low arc voltage monitor 190 comprises low voltage threshold detector 192, and an operational amplifier configured as a positive-going integrator 193. Monitor 190 provides a signal to process stop system 180 to disable the contactor relay 182 if the weld FB voltage drops below a prescribed "low arc voltage" threshold (typically 27 volts when the maximum weld voltage is 100 volts) for a prescribed "low arc voltage" length of time (typically 0.6 seconds). Dropping below the prescribed "low arc voltage" threshold for an extended period is an indication of electrode 58 shorting to workpiece 121. The shortout is a situation requiring that the arc cutting process be shut down relatively quickly if damage to the workpiece 121 and power supply 20 is to be avoided. Timing the shortout is necessary to avoid shutting down on a momentary electrode-to-workpiece contact. Normally (i.e., when the weld FB voltage analog exceeds the low voltage threshold setting of threshold detector 192) the output of timing integrator 193 is positive causing relay driver 182 to enable contactor relay 182. When the weld FB voltage drops below the threshold detector 192 setting, the output of threshold detector 192 changes from a negative maximum to a positive maximum (typically from −15 volts to +15 volts). The output of integrator 193 begins to linearly drop with respect to time. The integration time constant of integrator 193 is set to allow the integrator to drop to the voltage where relay driver 182 changes state in a time period of about 0.6 second from the start of low weld FP voltage.

Should the weld FB voltage rise above the low voltage threshold before relay driver 182 changes state, the process remains unaffected. The integrator 193 merely integrates back to a positive maximum.

Arc Off Retract System 200

The arc off retract system 200 comprises an operational amplifier configured as a positive-going integrator 201, a voltage comparator 202, relay driver 203, and retract override relay 206. Retract system 200 initiates the electrode retract mode of electrode feed retract motor 30 via the retract override relay 206 when the arc current drops below the prescribed low current threshold in low current threshold detector 240. Retract timing integrator 201 causes arc off comparator 202 and relay driver 203 to deenergize retract override relay 206 after sufficient time has passed to ensure that electrode feed retract motor 30 has retracted electrode 58 safely from workpiece 121. Deenergization of retract override relay 206 terminates the electrode retract mode of electrode feed retract motor 30.

Process Stop System 180

The process stop system 180 comprises a logic "or" relay driver 182 and contactor relay 184. Process stop 180 stops the electrode arc generation process if either of the inputs to low arc voltage monitor 190 or low arc current monitor 170 drop below threshold. Likewise, if both the low arc voltage monitor 190 and low arc current monitor 170 outputs are above threshold, the contactor relay 184 can be disabled by the start stop control 110.

Relay Switching 210

Relay switching 210 comprises contacts of relays 184, 165, 206, 154, 143. The function of the relay switching 210 is the initiation of the electrode feed, electrode retract, weld volts, and workpiece travel functions in response to enabling signals. Normally open contacts 184a-b and 165a are actuated by relays 184 and 165 respectively. Normally open contacts 206a are activated by retract override relay 206. Further normally open contacts 154a, 143a are actuated by relays 154 and 143 respectively.

Relays 143,154 are solid state devices to ensure rapid actuation (less than 5 milliseconds) of the feed and retract actions of the electrode motor 30.

In automatic control system 10, the following components have been used for the function and operation described and shown:

| Ref. Numeral | Component | Type |
|---|---|---|
| 141,151,152,163, 171,172,192,193, 201,202,221 | Quad. Operational Amplifier | MC4741 |
| 142,153,164, 182,203 | Relay Driver | EXAR XR2201 |
| 231,241 | Dual Operational Amplifier | XR1458 |

What is claimed is:

1. A control system for air-carbon arc metal removal having a power source for producing an arc between an electrode and a workpiece and at least one control device for controlling said system comprising:
   means for sensing the current of the arc between the electrode and the workpiece and providing an arc current derived signal, said arc current derived signal having frequency components;
   signal conditioning means coupled to the sensing means for receiving the arc current derived signal and removing the frequency components from the arc current derived signal;
   detection means for detecting arc current derived signals below a predetermined threshold level, which level is low in relation to the frequency components; and
   means for providing an arc current command signal in response to said detection and applying the command signal to the control device.

2. The control system of claim 1 in which the signal conditioning means comprises a low pass filter.

3. The control system of claim 2 in which the control device includes travel means for preventing relative motion between the electrode and the workpiece upon application of the command signal.

4. The control system of claim 2 in which the control device includes stop means for disconnecting the power source from the electrode upon application of the command signal.

5. The control system of claim 1 in which the control device includes retract means for automatically retracting the electrode from the workpiece for a predetermined amount of time sufficient to insure physical separation of the electrode and the workpiece upon application of said command signal.

* * * * *